H. R. STANDEFER.
AUTOMATIC WEIGHING SCALE.
APPLICATION FILED SEPT. 18, 1911.
1,046,885.
Patented Dec. 10, 1912.
2 SHEETS—SHEET 1.
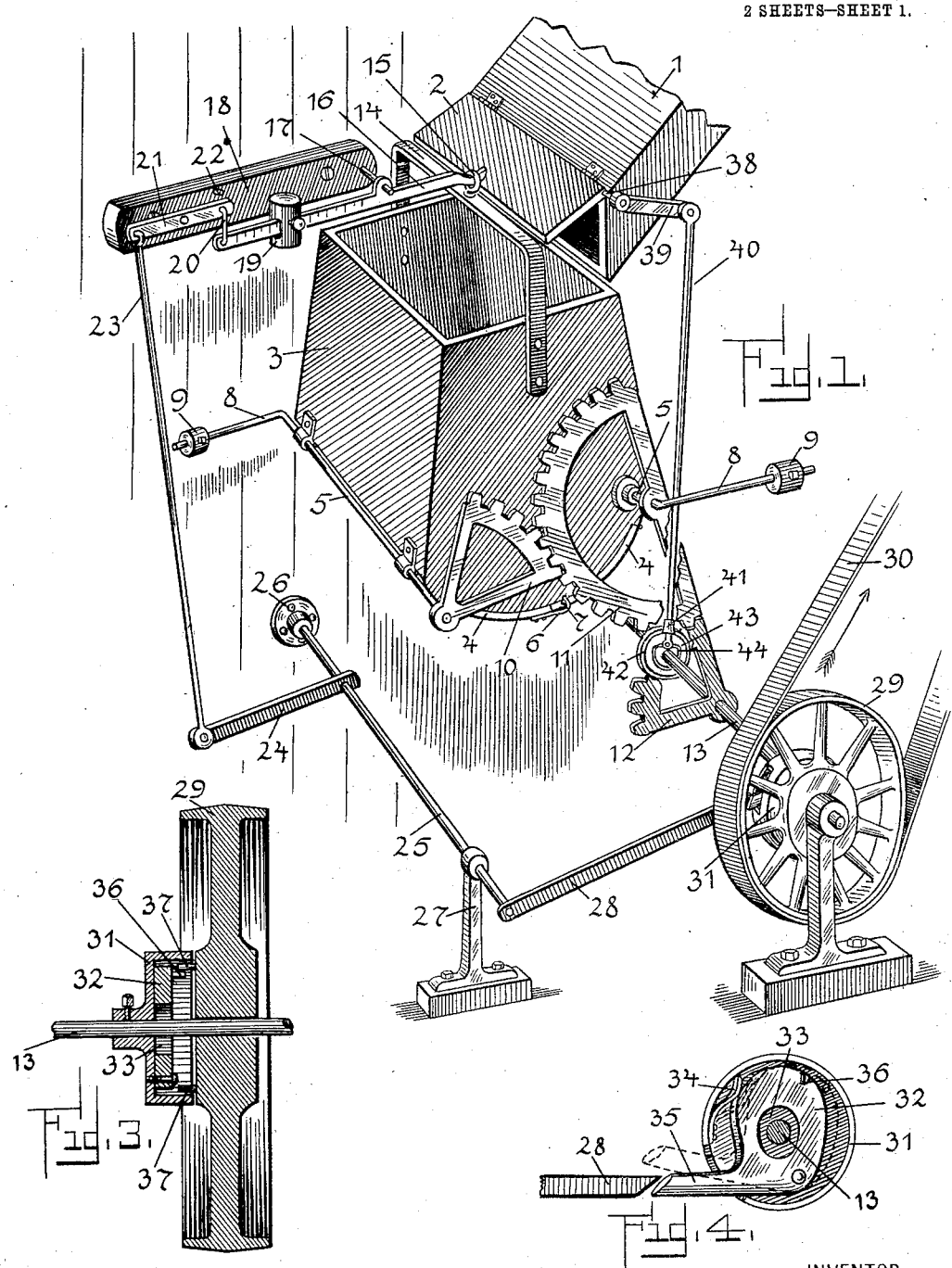
WITNESSES:
INVENTOR
*Henry R. Standefer*
BY
ATTORNEY H. R. STANDEFER.
AUTOMATIC WEIGHING SCALE.
APPLICATION FILED SEPT. 18, 1911.
1,046,885.
Patented Dec. 10, 1912.
2 SHEETS—SHEET 2.
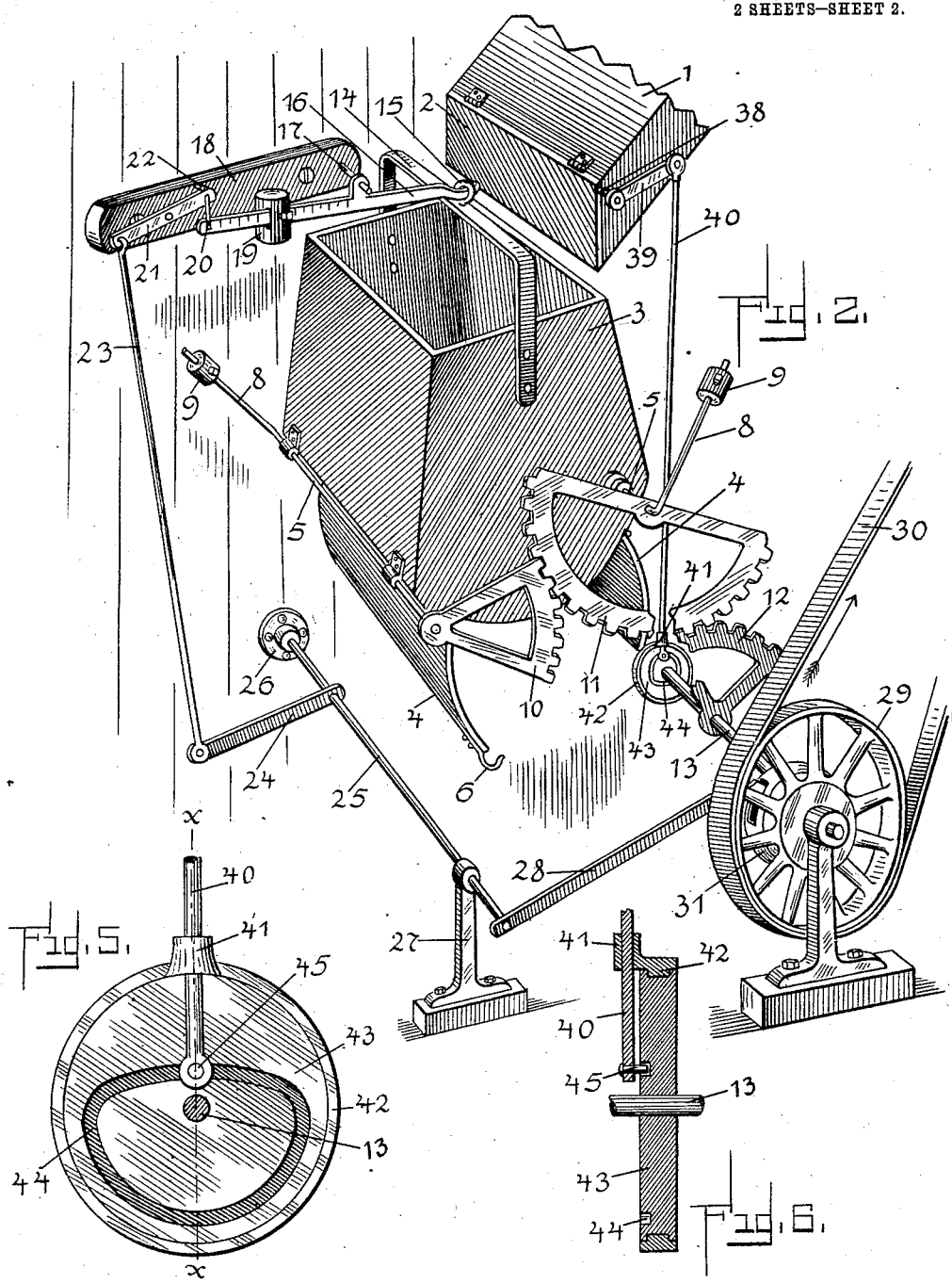
WITNESSES:
INVENTOR
Henry R. Standefer.
BY
ATTORNEY

UNITED STATES PATENT OFFICE.

HENRY R. STANDEFER, OF DALLAS, TEXAS.

AUTOMATIC WEIGHING-SCALE.

1,046,885.  Specification of Letters Patent.  Patented Dec. 10, 1912.

Application filed September 18, 1911. Serial No. 649,975.

*To all whom it may concern:*

Be it known that I, HENRY R. STANDEFER, a citizen of the United States, residing at Dallas, in the county of Dallas and State of Texas, have invented certain new and useful Improvements in Automatic Weighing-Scales, of which the following is a specification.

My invention relates to new and useful improvements in automatic weighing-scales. Its object is to provide a weighing scale entirely automatic in operation, which will be adapted for continuously weighing material in bulk, such as cotton seed, wheat, meal, et cetera, said material being supplied to the receiver of the scales in a continuous flow, interrupted only while said receiver is discharging, the quantity periodically discharged having a known weight.

Another object of the invention is to provide a scale of this character in which the quantity or weight of material periodically discharged may be readily varied without adding weights to the scales or removing them therefrom.

The invention also has for its object the provision of an improved form of mechanism for automatically operating the doors which are provided in the bottom of the receiver, including mechanical means for closing and locking said doors, and for opening the same at the proper time.

Finally the object of the invention is to provide a device of the character described that will be strong, durable, simple and efficient, and comparatively easy to construct, and also one the various parts of which will not be likely to get out of working order.

With these and various other objects in view, my invention has relation to certain novel features of the construction and operation, an example of which is described in the following specification and illustrated in the accompanying drawing, wherein:

Figure 1 is a perspective view of the automatic weighing-scale, showing the receiver thereof in the position which it occupies while receiving a charge, the receiver doors being closed and the door of the discharge chute open. Fig. 2 is a similar perspective view of the device, showing the positions occupied by the various parts while the receiver is discharging its contents, the receiver doors being open and the door of the discharge chute closed. Fig. 3 is a transverse sectional view of a drive pulley loose upon a shaft, said pulley being continuously driven and adapted by a novel form of clutch mechanism, shown in this figure, to periodically communicate rotation to the shaft for the purpose of operating the doors of the receiver and the discharge chute. Fig. 4 is a detail side view of the aforesaid clutch mechanism, showing the trip lever by which the clutch mechanism is operated. Fig. 5 is a side view of a cam mechanism, the cam being rigidly mounted upon the shaft which carries the aforesaid clutch, and which produces vertical displacement of a rod by which the door of the discharge chute is opened or closed. Fig. 6 is a vertical sectional view of the same, taken upon the line $x$—$x$ of Fig. 5.

Referring now more particularly to the drawings, wherein like numerals of reference designate similar parts in all the figures, the numeral 1 denotes an inclined discharge chute, provided with a hinged door 2 at its outlet, and receiving a continuous supply of the material to be weighed from an elevated bin or receptacle not shown. Just below the outlet of the chute, a receiver 3 is suspended in such a position as to receive the material discharging from the chute. The bottom of the receiver is formed by a pair of curved swinging doors 4, equal in size, and fast upon pintles 5, which are rotatably mounted at opposite sides of the receiver. When in their closed positions, a spring latch 6, upon one of the doors, engages a pin 7 upon the other, preventing the doors from swinging open owing to the weight of the material within the receiver. The walls of the receiver are inclined slightly outward from top to bottom, the contents thereof thus being enabled to discharge more freely.

At each end of the pintles 5 a right angled bend is provided, thus forming arms 8, perpendicular to the pintles and occupying an approximately horizontal position when the doors are closed. At the end of each arm 8, a weight 9 is mounted, and is adapted by a set-screw to be adjusted in various positions upon said arm. The weights 9 are sufficient to counter-balance the weight of the doors 4, causing said doors to immediately swing shut when released from the means employed to hold them open when the receiver is discharging.

At one end of the receiver, a pair of segmental gears 10 and 11 are rigidly mounted upon the pintles 5, said gears being normally intermeshed. The smaller segment 10 covers approximately an arc of forty-five degrees, and the larger segment 11 extends through about one-hundred and eighty degrees. The segment 11 is in mesh at its lowest point with a third segment 12, rigidly mounted upon a horizontal shaft 13, and extending through an arc of approximately ninety degrees. At periodic intervals the shaft 13 passes through a single rotation, during the first quarter of which rotation, the segment 11 is engaged by the segment 12, causing a sufficient rotation to be communicated to both pintles 5 to swing open both the doors 4, bringing them to the position shown in Fig. 2. After the shaft 13 has rotated through a quarter revolution, the segment 12 escapes from engagement with the segment 11, permitting the doors to again swing shut under the impulse of the weights 9, while the shaft 13 continues in its revolution until the segment 12 is brought back to its original position shown in Fig. 1. The periodic rotations thus communicated to the shaft 13 are due to the accumulation in the receiver of a sufficient amount of material to produce a slight downward displacement of the same, and a description will now be given of the mechanism employed to set up a rotation of the shaft 13, due to the downward displacement of the receiver.

The receiver is provided with a bail or handle 14, having a small ring 15 at its center. The ring 15 receives the slightly hooked extremity of a beam 16, pivotally mounted near its middle upon a horizontal pin 17 rigidly projecting from a stationary bar 18. The beam 16 is provided with a sliding weight 19, upon its extremity opposite to that carrying the hook, and said extremity is graduated to indicate various positions which the weight 19 must occupy to exactly counter-balance some certain weight of material in the receiver. That extremity of the beam 16, which carries the sliding weight, is connected by a swinging link 20 with one end of a centrally pivoted horizontal lever 21, a pin 22 being mounted upon the bar 18 just above said end of the lever 21 to limit the angular displacement of said lever, and thus limit the possible downward displacement of the receiver. The other extremity of the lever 21 is connected by a freely swinging rod 23 with the extremity of an arm 24, projecting rigidly from a rock-shaft 25, rotatably mounted in a flange bearing 26 at one end, and a floor bracket 27 at the other. Adjacent to the bracket 27 an arm 28 projects rigidly from the shaft 25 in a direction opposite to that of the arm 24, terminating adjacent to the shaft 13, and having its extremity slightly beveled as is clearly shown in Fig. 4.

Upon the shaft 13, adjacent to the beveled extremity of the arm 28, is mounted a loose pulley 29, adapted to receive a continuous rotation through a belt 30. Adjacent to the pulley at one side thereof, a casing 31 is rigidly mounted upon the shaft, the open side of the casing being toward the pulley. Within the casing is pivotally mounted, an irregularly shaped curved plate 32, its pivotal point being adjacent to the circular wall of the casing at one side, and its other side being adapted to contact with the wall of the casing when the plate is subjected to a slight swinging motion about its pivot. The plate is provided with a central aperture 33 of sufficient size to permit the plate to undergo such a swinging motion without being hindered through contact with the shaft 13. The plate is acted upon by a curved spring 34, secured to the circular wall of the casing, and tending to produce angular displacement of the plate about its pivotal point such as to bring the edge of the plate into contact with the circular wall of the casing. An arm 35 projects from the plate adjacent to its pivotal point, the extremity of said arm being beveled to correspond with the beveled extremity of the arm 28. When the parts of the weighing scale occupy the position shown in Fig. 1 and the receiver is being filled, the arm 35 projects in a horizontal direction, as shown in Fig. 4, and it is prevented from upward displacement due to the action of the spring 34 upon the plate 33 through contact with the extremity of the arm 28. When the receiver undergoes a slight downward displacement due to its contents having become sufficient to counter-balance the weight 19, the beam 16 undergoes a slight angular displacement, which is communicated through the link 20 to the lever 21. The lever 21 communicates a slight downward displacement to the rod 23, thus producing a partial rotation to the rock-shaft 25 sufficient to raise the arm 28 and free the arm 35 from the extremity of said arm. When the arm 35 is thus freed, the plate 32 swings about its pivotal support under the action of the spring 34. The plate 32 is provided with a projecting pin 36, adjacent to that point which comes into contact with the circular wall of the casing. The displacement of the pin, resulting from the pivotal motion of the plate 32, brings the pin into the path of rotation of two pins 37 projecting from the hub of the wheel 29, and extending slightly into the casing 31. Owing to the contact of one of the pins 37 with the pin 36, a rotation will be communicated to the shaft 13 as soon as the arm 35 is released by the arm 28. This rotation will continue through one revolution, the receiver in the meantime discharging its contents, and regaining its normal position. Thus when the shaft 13 has completed its revolution, the arm 35 will again encounter the arm 28, so that further rotation cannot occur until the receiver has received its load, and again undergone a slight downward displacement.

A description will now be given of the mechanism employed to close the door 2 of the discharge chute when the receiver has received its proper charge. Said door is provided at one end with a pin 38, coincident with the axis of rotation of the door. Upon this pin is rigidly mounted an arm 39, to the extremity of which is pivoted the upper end of an upright rod 40. The lower extremity of said rod passes through a sleeve 41, rigidly mounted upon a ring 42, loose upon a circular disk 43, said disk being fast upon the shaft 13. The sleeve 41 is supported at one side of the ring 42 permitting the shaft 40 to project downward adjacent to the surface of the disk 43. Upon this surface is provided a cam groove 44, which groove receives a pin 45 carried rigidly by the lower extremity of the rod 40. The cam groove 44 is so formed as to produce a rapid upward displacement of the rod 40 during the first quarter revolution. During the next half revolution, the rod 40 is held in the same elevated position, and during the final quarter revolution, the rod 40 is rapidly lowered to its first position. When the rod 40 is in its highest position, the door 2 is closed, and when said rod is in its lowest position, the door is opened. Since the door 2 is open, except during the periodic intervals when the receiver is discharging, the normal position of the cam and the rod 40 will thus be that shown in Fig. 5 and Fig. 6. The cam mechanism just described is employed instead of the ordinary eccentric to actuate the rod 40 for the reason that it is necessary to close the door 2 rapidly and hold it closed until the receiver has discharged and its doors have closed in order to prevent an excess charge escaping from the chute 1. The teeth of the segments 11 and 12 may be made somewhat longer than ordinary gear teeth in order to compensate for the existence of a slight space between the teeth of these two intermeshed segments when the receiver is in its normal raised position. The slight downward displacement which the receiver undergoes when fully charged is sufficient to bring the segments 11 and 12 into close mesh.

By means of the above automatic weighing scale, any quantity of bulk material, such as cotton seed, grain, et cetera, may be withdrawn from the receptacle or bin containing the same in quantities having a certain known weight, the amount of which weight is capable of regulation.

It is obvious that various changes may be made in the above described invention without sacrificing the advantages or departing from the spirit thereof, and the device is, therefore, presented as including all such changes and modifications as may be included within the scope of the following claims.

What I claim is:

1. In an automatic weighing-scale, the combination with a receiver adapted to undergo a slight downward displacement when its contents reach a certain weight, of a pair of doors forming the bottom of said receiver, pintles upon which the doors are rigidly mounted, a pair of intermeshed segmental gears rigid upon said pintles, arms projecting rigidly from the pintles at right angles thereto, weights adjustable upon the extremities of said arms, a shaft adjacent to the receiver, parallel to said pintles, a segmental gear rigid upon said shaft, and engaging one of the first mentioned segmental gears, a pulley loose upon said shaft, a clutch device fast on the shaft adjacent to said pulley, and adapted to engage the pulley, and a mechanism actuated by downward displacement of the receiver adapted to engage the clutch mechanism with the pulley.

2. In an automatic weighing-scale, the combination with a receiver adapted to undergo a slight downward displacement when its contents reach a certain weight, of a pair of doors forming the bottom of said receiver, pintles upon which the doors are rigidly mounted, a pair of intermeshed segmental gears rigid upon said pintles, a shaft adjacent to the receiver, parallel to said pintles, a segmental gear rigid upon said shaft and engaging one of the first mentioned segmental gears, a pulley loose upon said shaft, a clutch device fast on the shaft adjacent to said pulley and adapted to engage the same, a mechanism actuated by a downward displacement of the receiver, adapted to produce engagement between the clutch mechanism and the pulley, and means for automatically closing said doors when released by the means which opens them.

3. In an automatic weighing-scale, the combination with a receiver, adapted to undergo a slight downward displacement when its contents reach a certain weight, of a pair of doors forming the bottom of said receiver, pintles upon which the doors are rigidly mounted, a pair of intermeshed segmental gears rigid upon said pintles, a shaft adjacent to the receiver parallel to said pintles, a segmental gear rigid upon said shaft, and engaging one of the first mentioned segmental gears, a pulley loose upon said shaft, a clutch device fast on the shaft adjacent to said pulley and adapted to engage the pulley, a mechanism adapted to be actuated by a downward displacement of the receiver, and adapted to produce engagement between the clutch mechanism and the pulley, means for automatically closing the receiver doors when released by the means employed to open the same, a door controlling the discharge of material into the receiver, and a mechanism adapted to close said door when the receiver door is opened, and to open said door after the receiver door has been closed.

4. In an automatic weighing-scale, the combination with a receiver adapted to undergo a slight downward displacement, of a pair of doors forming the bottom of said receiver, pintles upon which the doors are rigidly mounted, a pair of intermeshed segmental gears rigid upon said pintles, an arm projecting perpendicularly from each pintle, a weight adjustable upon each of said arms, a shaft adjacent to the receiver parallel to said pintles, a segmental gear rigid upon said shaft, and engaging one of the first mentioned segmental gears, a pulley loose upon said shaft, a clutch device fast on the shaft adjacent to said pulley, and adapted to engage the pulley, a mechanism adapted to be actuated by a downward displacement of the receiver, and adapted to produce engagement between said clutch mechanism and the pulley, a door controlling the discharge of material into the receiver, and a mechanism adapted to close said door when the receiver door is opened and to open said door after the receiver door has been closed.

5. In an automatic weighing-scale, the combination with a receiver adapted to undergo a slight downward displacement when its contents reach a certain weight, of a door in the bottom of said receiver, a shaft rotatably mounted adjacent to the receiver, a pintle upon which the door is rigidly mounted, means loose upon the shaft adapted to communicate rotation thereto, a clutch fast upon the shaft adjacent to the last named means, and acting in conjunction with the same, a mechanism actuated by a downward displacement of the receiver, and adapted to produce engagement between the clutch and the means adjacent thereto, gearing adapted to communicate rotation from said shaft to the pintle of the receiver door, means for automatically closing said door when the receiver has discharged its contents, a cam rigid upon said shaft, a door controlling the discharge of material into the receiver, an arm rigid upon said door adapted to open or close the door by angular displacement, and a rod having its upper end pivotally secured to the extremity of said arm and its lower end acted upon by said cam to produce a vertical displacement.

6. In an automatic weighing-scale, the combination with a receiver adapted to undergo a slight downward displacement when its contents reach a certain weight, of a pair of doors forming the bottom of said receiver, pintles upon which the doors are rigidly mounted, a pair of intermeshed segmental gears rigid upon said pintles, an arm projecting at right angles from each pintle, a weight adjustable upon the extremity of each arm, a shaft adjacent to the receiver parallel to said pintles, a segmental gear rigid upon said shaft and engaging one of the first mentioned segmental gears, a pulley loose upon said shaft, a clutch device fast on the shaft adjacent to said pulley, and adapted to engage the pulley, a mechanism actuated by a downward displacement of the receiver adapted to produce engagement between the clutch mechanism and the pulley, a door controlling the discharge of material into the receiver, an arm rigidly mounted upon said door, and adapted to open or close the same when subjected to angular displacement, a rod having its upper extremity pivotally attached to said arm, and a cam rigid upon said shaft adapted to produce vertical displacement of said rod.

In testimony whereof I have signed my name to this specification in the presence of two subscribing witnesses.

HENRY R. STANDEFER.

Witnesses:
L. MORRIS,
J. O. MURRAY.

---

Copies of this patent may be obtained for five cents each, by addressing the "Commissioner of Patents, Washington, D. C."